United States Patent
Cukierman et al.

(10) Patent No.: US 7,716,651 B2
(45) Date of Patent: May 11, 2010

(54) SYSTEM AND METHOD FOR A CONTEXT-AWARENESS PLATFORM

(75) Inventors: Ryan Edward Cukierman, Redmond, WA (US); Christopher Michael Hahn, Bellevue, WA (US); Vikram Madan, Bellevue, WA (US); Ravipal Soin, Sammamish, WA (US); Kamesh Chander Tumsi Dayakar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

(21) Appl. No.: 11/044,354

(22) Filed: Jan. 26, 2005

(65) Prior Publication Data

US 2006/0200834 A1    Sep. 7, 2006

(51) Int. Cl.
  *G06F 9/44* (2006.01)
  *G06F 15/16* (2006.01)
  *G06F 15/173* (2006.01)
(52) U.S. Cl. .................. 717/130; 709/203; 709/223; 709/238
(58) Field of Classification Search .................. None
  See application file for complete search history.

(56) References Cited

U.S. PATENT DOCUMENTS

| | | | |
|---|---|---|---|
| 6,131,166 A | 10/2000 | Wong-Insley | |
| 6,298,378 B1 * | 10/2001 | Angal et al. | 709/223 |
| 6,401,138 B1 | 6/2002 | Judge | |
| 2002/0021278 A1 | 2/2002 | Hinckley | |
| 2002/0124067 A1 * | 9/2002 | Parupudi et al. | 709/223 |
| 2003/0131142 A1 * | 7/2003 | Horvitz et al. | 709/313 |
| 2003/0139968 A1 * | 7/2003 | Ebert | 705/22 |
| 2004/0122892 A1 * | 6/2004 | Brittenham et al. | 709/203 |
| 2005/0165828 A1 * | 7/2005 | Lango et al. | 707/102 |

FOREIGN PATENT DOCUMENTS

WO    WO 02/099597 A2 *    12/2002

* cited by examiner

*Primary Examiner*—Michael J Yigdall
*Assistant Examiner*—Ben C Wang
(74) *Attorney, Agent, or Firm*—Workman Nydegger (57) ABSTRACT

An improved system and method for a context-awareness platform that may be used to adapt an execution environment is provided. A framework with interfaces for setting, tracking, and getting context information about the execution environment of a computer system includes a context engine and a unified data store for aggregating context information at a platform level for access by executables running on the platform. The context engine may receive requests to perform context information operations from executables such as setting, tracking and getting context information in the data store. Upon receiving a notification of a change in context information, one or more executables may change the execution environment such as reconfiguring system settings. In this way, an executable may adapt its execution environment using context information.

14 Claims, 8 Drawing Sheets

SYSTEM AND METHOD FOR A CONTEXT-AWARENESS PLATFORM

FIELD OF THE INVENTION

The invention relates generally to computer systems, and more particularly to an improved system and method for a context-awareness platform that may be used to adapt an execution environment.

BACKGROUND OF THE INVENTION

Computer users have been frustrated for a long time by the inability of computer systems to intelligently adapt to new or changed computing and/or operating environments. This frustration may be even more acute for users of mobile computers who may work on numerous different activities, often at multiple physical locations and under varying circumstances. For instance, at the beginning of a day, a mobile computer user may be home, interacting with family or friends using email or instant messaging. The mobile computer user may then later make a presentation during a meeting at work. In the evening, the mobile computer user may be preparing a business proposal while traveling on an airplane for a business meeting the next day.

Unfortunately, the computer may remain similarly configured for each of these different environments and uses, even when the configuration for one environment no longer remains relevant and needs to be changed in another environment. For example, a user may need to configure the mobile computer for changes in physical location when the user moves between a home network and a work network. In this case, the user may need to change the default printer setting, the default internet browser home page, the internet browser proxy settings, and other related settings. A user may also need to configure the computer for changes in activity. For instance, a user preparing to make a presentation may adjust the volume of the computer, turn off instant message notifications, turn off a screensaver time-out, and make other setting adjustments. The user may also need to configure the computer to interact with different people at work than those at home. For example, a different default email account may be used at home to communicate with friends and family than the email account used at work. As a result, a mobile computer user may have to reconfigure a mobile computer each time the computing environment changes.

What is needed is a way for a computer system to accumulate and expose context information about the computing environment, such as the physical location, the people the user may interact with at the physical location, the user's activities, etc., so that the context information may be used to intelligently adapt the computer to the computing environment. Such a system and method should accumulate and expose context information in a uniform and systematic way so that any executable may provide or use the context information to intelligently adapt the computer system.

SUMMARY OF THE INVENTION

Briefly, the present invention provides an improved system and method for a context-awareness platform that may be used to adapt an execution environment. To this end, the present invention provides components and a framework with interfaces for setting, tracking, and getting context information about the execution environment of a computer system. Among the components provided may be a context platform operably coupled to various executables and data storage facilities including a unified data store. The data store may provide unified storage of context information for the context platform by aggregating context information at a platform level for access by executables running on the platform. Any type of context information may be stored, including, but not limited to, user context data, executable context data and system context data.

The context platform may include context application programming interfaces and executable code, henceforth referred to as the context engine, for coordinating the programmatic interactions and data interchange between various parts of the context platform and other executables. The context application programming interfaces may provide access for executables to set, track, or get context information. Any executable may be operably coupled to the context application programming interfaces to set, track, or get context information. The context engine may receive requests to perform context information operations from executables such as setting, tracking and getting context information in the data store. For example, the context engine may receive a request to update context information, may look up the executables that requested to be notified about a change of the context information, and may then send a notification of the change in the context information to the executables. As a result of receiving a notification of a change in context information, one or more executables may change the execution environment such as reconfiguring system settings. In this way, an executable may adapt its execution environment using context information.

The context platform may advantageously allow a computer system to accumulate and expose context information about the execution environment, such as the physical location, the people the user may interact with at the physical location, and the user's activities, etc., so that the context information may be used to intelligently adapt the computer to the execution environment. Furthermore, the context platform is extensible and supports any number of executables which may provide and use context information. Additionally, the context platform may support context information data of any size and/or format. Other advantages will become apparent from the following detailed description when taken in conjunction with the drawings, in which

DETAINED DESCRIPTION

Exemplary Operating Environment

Figure 1:
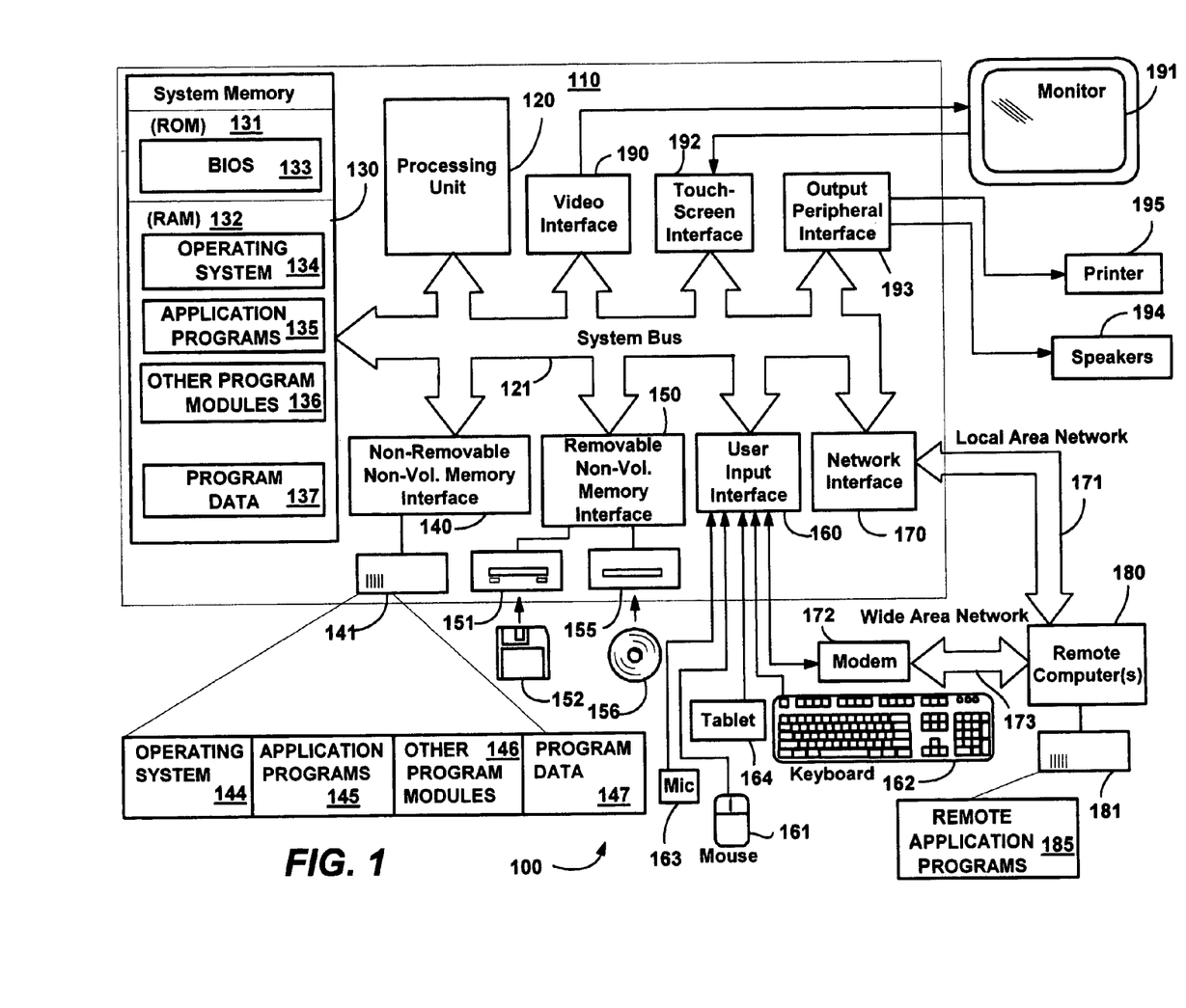
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like connected to the system bus 121 via touch screen interface 192. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Context-Awareness Platform

The present invention is generally directed towards a system and method for a context-awareness platform. The context-awareness platform may advantageously allow a computer system to accumulate and expose context information about the execution environment, such as the physical location, the people the user may interact with at the physical location, and the user's activities, etc., so that the context information may be used to intelligently adapt the computer to the execution environment. An execution environment as used herein means executable settings, such as installation or configuration settings, executable instructions, and operating system services. As will be seen, the architecture of the present invention provides components and a framework with interfaces for setting, tracking, and getting context information about the execution environment of a computer system. Among the components provided may be a context engine and a unified data store for aggregating context information at a platform level for access by executables running on the platform. Any type of context information may be stored, including user context data, executable context data and system context data. As will be understood, the various block diagrams, flow charts and scenarios described herein are only examples, and there are many other scenarios to which the present invention will apply.

Figure 2:
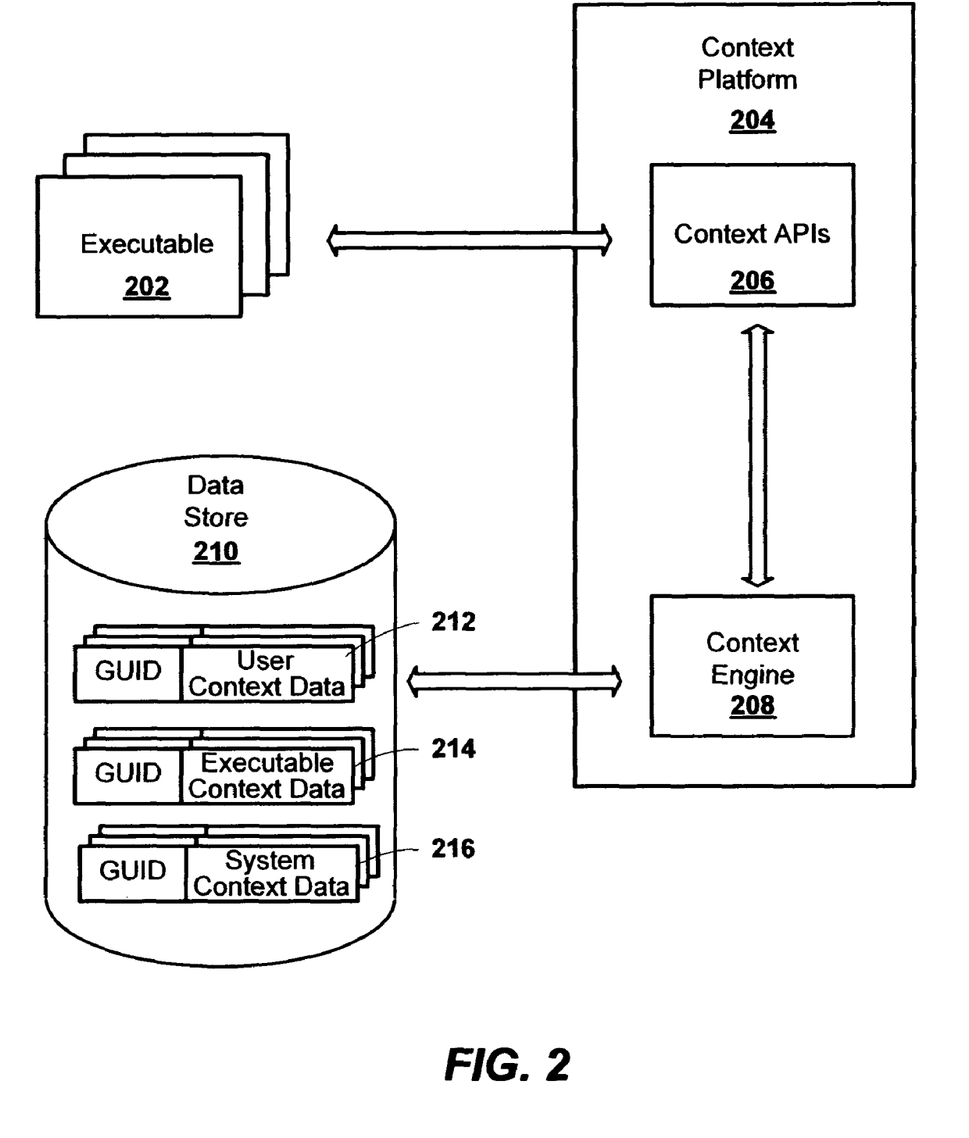
FIG. 2 is a block diagram generally representing an exemplary architecture of system components in one embodiment of a context-awareness platform, in accordance with an aspect of the present invention.

Turning to FIG. 2 of the drawings, there is shown a block diagram generally representing an exemplary architecture of system components for a context-awareness platform. Those skilled in the art will appreciate that the functionality implemented within the blocks illustrated in the diagram may be implemented as separate components or the functionality of several or all of the blocks may be implemented within a single component. As an example, the functionality of the context APIs 206 in the context platform 204 may be implemented in a separate component.

The context platform 204 shown in FIG. 2 may be operably coupled to various executables 202 as well as to storage facilities such as data store 210. The context platform 204 may include context application programming interfaces (APIs) 206 and a context engine 208. The context APIs 206 may be an application programming interface (API), an object, a control or other executable code. The context APIs 206 may provide, for example, access to set, track, or get context information by including invocable interfaces such as SetContextData to add context information to the data store 210, TrackContextData to be notified of updates to context information in the data store 210 and GetContextData to retrieve context information in the data store 210. Other context APIs may also be used to manipulate the context information.

The context engine 208 may be any executable software code including a kernel component, an application component, a component of a linked library, an object, and so forth. The context engine 208 may receive requests to perform context information operations from executable software code such as setting, tracking and getting context information in the data store 210. For example, the context engine 208 may keep track of requests to be notified of an update or change in context information and may notify executables upon receiving an update or change of the context information requested to be tracked. For purposes of persistently storing context information, the context engine 208 may be operably coupled to various storage facilities such as data store 210. The context engine 208 may associate a unique identifier such as a GUID with a block of context data representing the context information that may be used for storing the context information.

Data store 210 may provide unified storage of context information for the context platform 204 by aggregating context information at a platform level for access by executables running on the platform. The data store may store context types. A context type may be a GUID that serves as an identifier of context information represented by a data block of bits. Context information as used herein includes, but is not limited to, any information about the logical and physical execution environment including location, activity and state information. Indeed, context information may be any size, format, or type of data. For example, context information may include binary data, formatted data, media data such as audio or video, human readable data, XML, encrypted data, and so forth. Among the various context information stored in data store 210 may be user context data 212, executable context data 214 and system context data 216. User context data 212 may include information about activities of the user such as surfing the web, using a presentation program, and so forth. Executable context data 214 may include information about the state of an executable such as program settings, opened files, and so forth. And system context data 216 may include information about the system state such as the state of hardware devices like battery power level, network connectivity, and so forth.

An executable may be any application program, kernel component, or other executable that may provide or obtain context information and/or adapt its computing environment according to a change in context information. An executable 202 may be operably coupled to the context APIs 206 to access invocable interfaces to set, track, or get context information. For example, the Network Location Awareness (NLA) service for the Microsoft® Windows XP operating system may monitor for network changes and may provide the network information to the context platform by invoking the SetContextData API to set the context information of the network to the new network connection. The context engine may receive the new value to associate with the network connection and it may look up the executables that invoked the TrackContext API to be notified about the change of context information for the network connection. The context engine may then send a notification of the change in context information for the network connection to these executables. As a result of receiving the notification of the change in network connection, one or more executables may change system settings such as the default printer setting, the default internet browser home page, the internet browser proxy settings, and so forth. In this way, an executable may adapt its execution environment using the context information upon notification of an update of context information.

Figure 3:
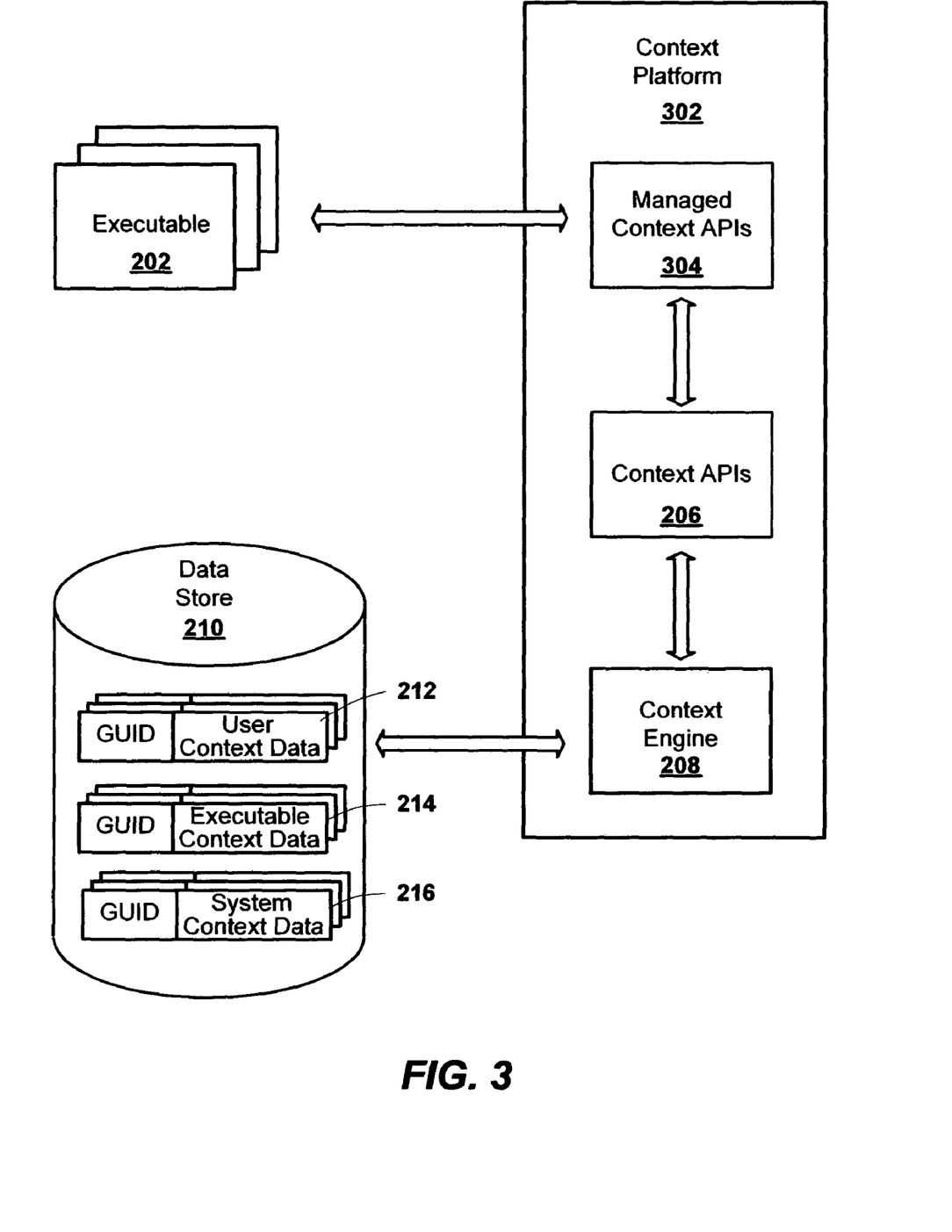
FIG. 3 is a block diagram generally representing an exemplary architecture of system components in another embodiment of a context-awareness platform, in accordance with an aspect of the present invention.

FIG. 3 presents a block diagram generally representing an exemplary architecture of system components for a context-awareness platform in an alternate embodiment. In addition to the system components discussed in conjunction with FIG. 2, managed context application programming interfaces 304 may be operably coupled to context APIs 206 for providing an implementation of a context platform 302 using managed code. Managed code refers to software code developed for the Microsoft® .NET Platform and contains metadata that may be used by the Microsoft® Common Language Runtime (CLR). Advantageously, the .NET runtime may manage data-related tasks such as allocating memory, reclaiming memory, type checking and other data-related tasks. The managed context APIs 304 may include a ContextClient object with two static methods, SetContext and GetContext, and a set of non-static methods that allow executables to receive context information events using .NET interoperability assemblies rather than interacting with window messages directly. The managed context APIs 304 may be operably coupled to the context APIs 206 and use the context APIs 206 described above using .NET interoperability assemblies to communicate with the context engine 208.

The SetContext method may be used by executables to provide new context information on a type of context. The type of context may be determined by the type of object passed to the method. The context engine may store the context information by associating it with the GUID corresponding to the object passed to the method. Executables may use the GetContext method to obtain the current context information for a particular type of context. The context engine may use the GUID for the type of context to lookup stored context information that may be written into the data store by a previous call to the SetContext method.

The managed context APIs 304 may also include an event mechanism accessible by an object called a ContextClient. The ContextClient may expose an event named ContextChanged and an event handler named ContextChangedEventHandler that may make use of a ContextChangedEventArgs object with properties such as OldContext, NewContext, ContextType and Stale. The OldContext and NewContext properties may allow the event receiver to determine the state of the context before and after it was changed so that the receiver may take appropriate action. The ContextType may represent the type of the objects in this event. Finally, the Stale flag may be used to indicate whether or not the executable that provided this context information may still be resident in volatile memory.

Figure 4:
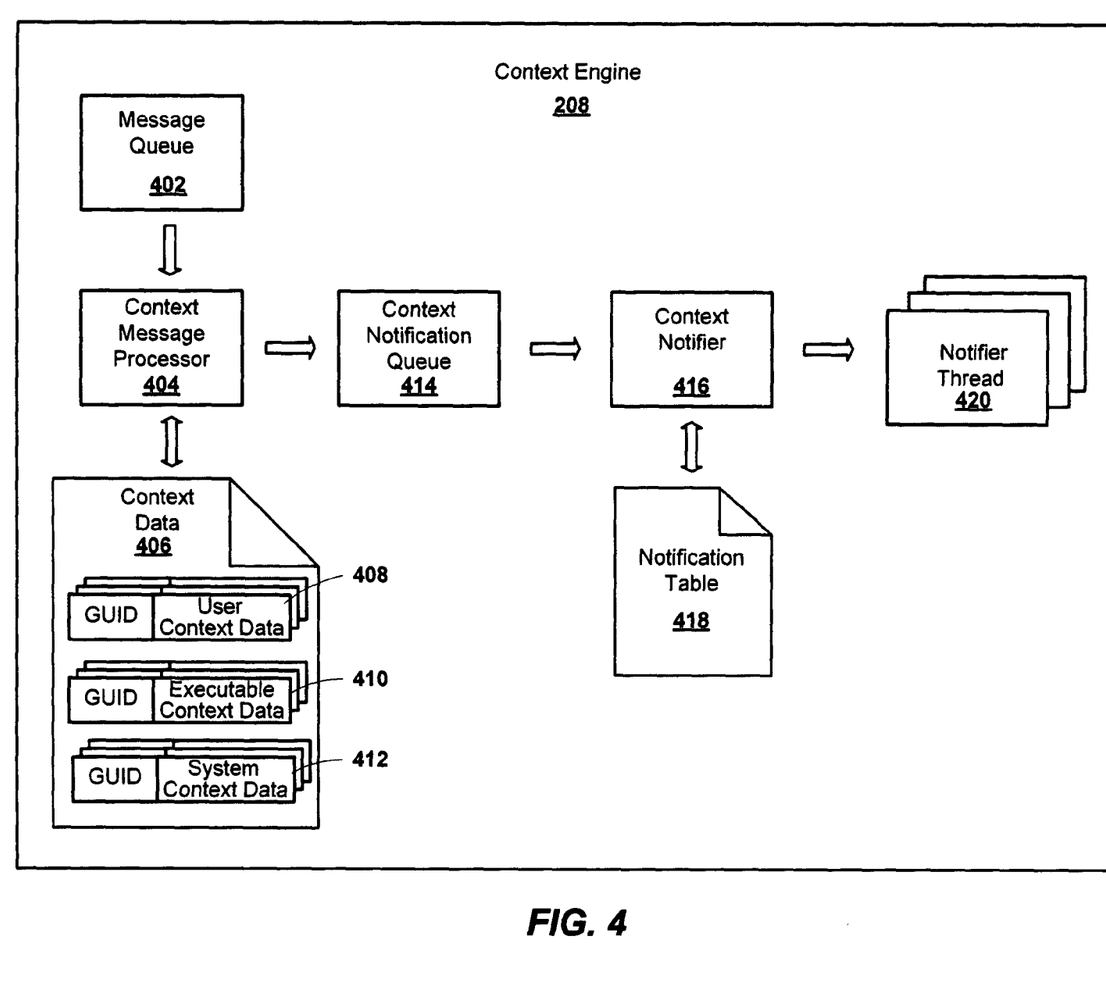
FIG. 4 is a block diagram generally representing an exemplary architecture of system components for a context engine that may be included in various embodiments of the context platform, in accordance with an aspect of the present invention.

FIG. 4 presents a block diagram generally representing an exemplary architecture of system components for a context engine that may be included in various embodiments of the context platform. The context engine 208 may receive requests to perform context information operations from a message queue, may update the data store 210 with updates of context information, and may then notify executables 202 of the changes. The context engine 208 may include a message queue 402, a context message processor 404, context data 406, a context notification queue 414, a context notifier 416, a notification table 418, and one or more notifier threads 420. In one embodiment, whenever requests sent by executables for context information operations may be received in message queue 402, the operating system may dispatch the context message processor 404 to handle the messages. The messages that may be received by the context engine 208 may include a SetContextData request to add context information to the context data 406, a TrackContextData request to be notified of updates to context information in the context data 406 and a GetContextData request to retrieve context information from the context data 406.

The context message processor 404 may store the context information in memory as illustrated by context information 406. Among the various context information stored in context data 406 may be user context data 408, executable context data 410 and system context data 412. The context engine 208 may store context information as a GUID with an associated data block containing the context information. Whenever a GetContextData request may be received, the context message processor 404 may obtain the context information requested from context data 406 and may place a copy of the context information in a shared memory buffer, or memory mapped file or other shared location such as an on-disk file or a system registry, etc., so that an executable may read it upon receiving notification. Whenever a SetContextData request may be received, the context message processor 404 may update the context data 406 by adding the context information in the SetContextData request to the context data 406, and then the context message processor 404 may place the context information in the context notification queue 414. In one embodiment, the context information may be an update object that may include the old context information, the new context information, and a list of executables that requested to be notified of an update in this context information. In another embodiment, the list of executables that requested to be notified of an update in context information may be separately stored in notification table 418 where lists of executables may be associated with one or more context types or GUIDs. After the context information may be placed in the context notification queue 414, a context notifier 416 may be awakened. In one embodiment, the context notifier 416 may be a thread spawned by the context engine 208. The context notifier 416 may read updates of context information from the context notification queue 414 and send a notification message to each executable that requested to be notified of an update in this context information.

In one embodiment, the context notifier 416 may spawn one or more notifier threads 420 for asynchronously sending a notification message with the context information to notify an individual executable of an update of the context information. Thus, a syncronous block by any executable on a notifier thread may not prevent sending other notifications and any number of notifications may be sent to executables without requiring completion of a previous sent notification to any one executable. Upon receiving notification of an update of context information, an executable may access the update of context information from a shared location such as a shared memory buffer or memory mapped file.

Periodically, the context engine 208 may write the context information in the context data 406 to persistent storage such as data store 210. The context engine 208 may also write the notification table 418 to persistent storage. In one embodiment, the context engine 208 may go to sleep after a period of inactivity. Prior to going to sleep, the context engine 208 may write the context data 406 and the notification table 418 to persistent storage, The default period of inactivity may be one hour, for example. In various embodiments, other periods of time may be used that may be suitable for the expected duration of user activities. In some embodiments, the duration may be set by the user. When the context engine may be awakened, it may read the context data from persistent storage and write it to the context data 406 as well as read the notification lists from persistent storage and write them to the notification table 418.

Figure 5:
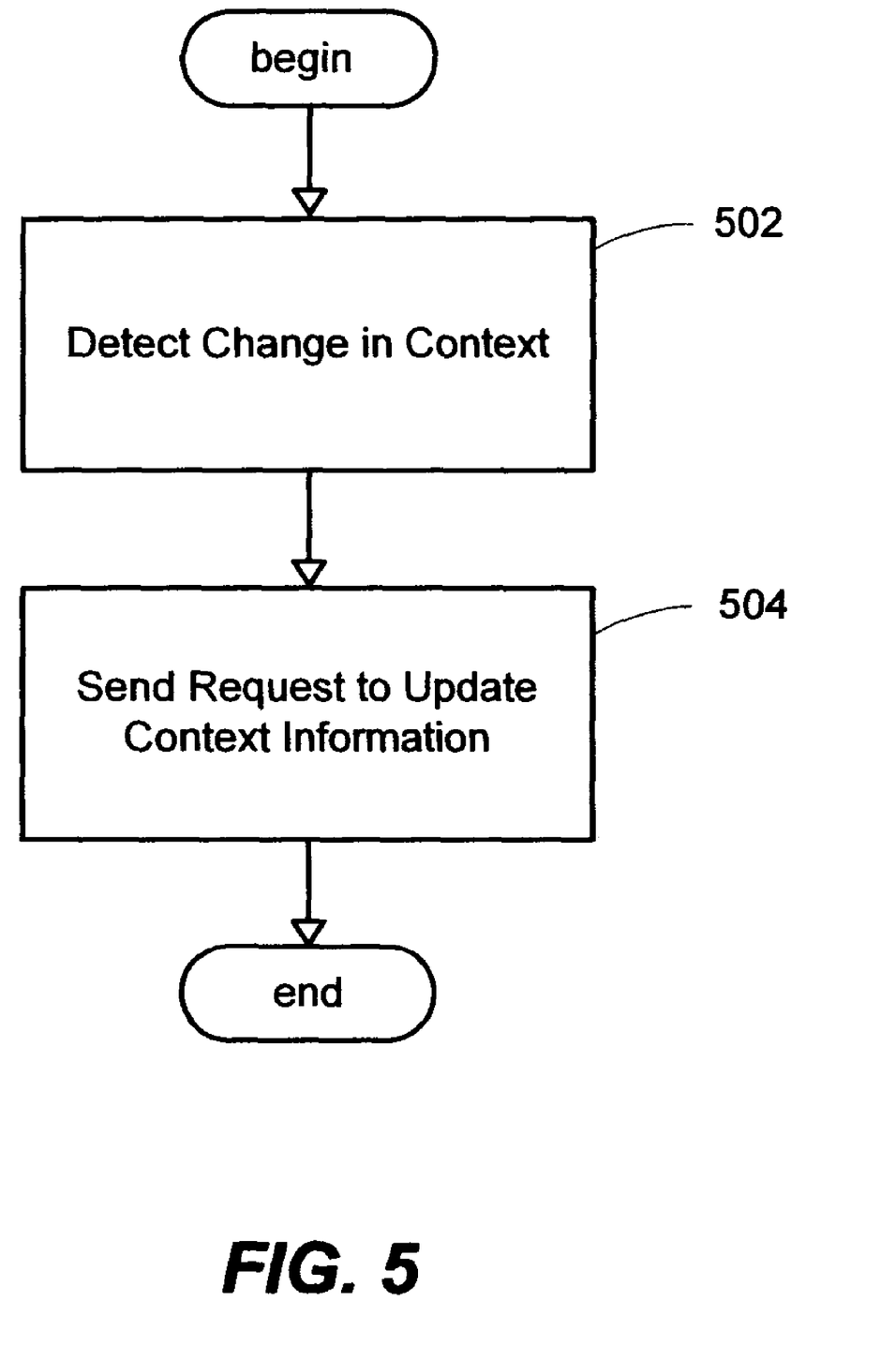
FIG. 5 is a flowchart generally representing exemplary steps undertaken by an executable in one embodiment for setting context information, in accordance with an aspect of the present invention.

Whenever an executable may wish to provide context information for use by other executables, the executable may send a set request to the context engine. FIG. 5 presents a flowchart generally representing exemplary steps undertaken by an executable in one embodiment for setting context information. A change in context may first be detected at step 502. And then a request to set context information may be sent at step 504. For example, an executable such as the Network Location Awareness (NLA) service for the Microsoft® Windows XP operating system may monitor for network changes and may detect a new network connection. The executable may then provide the network information to the context platform by invoking the SetContextData API to set the context information of the network to the new network connection.

Figure 6:
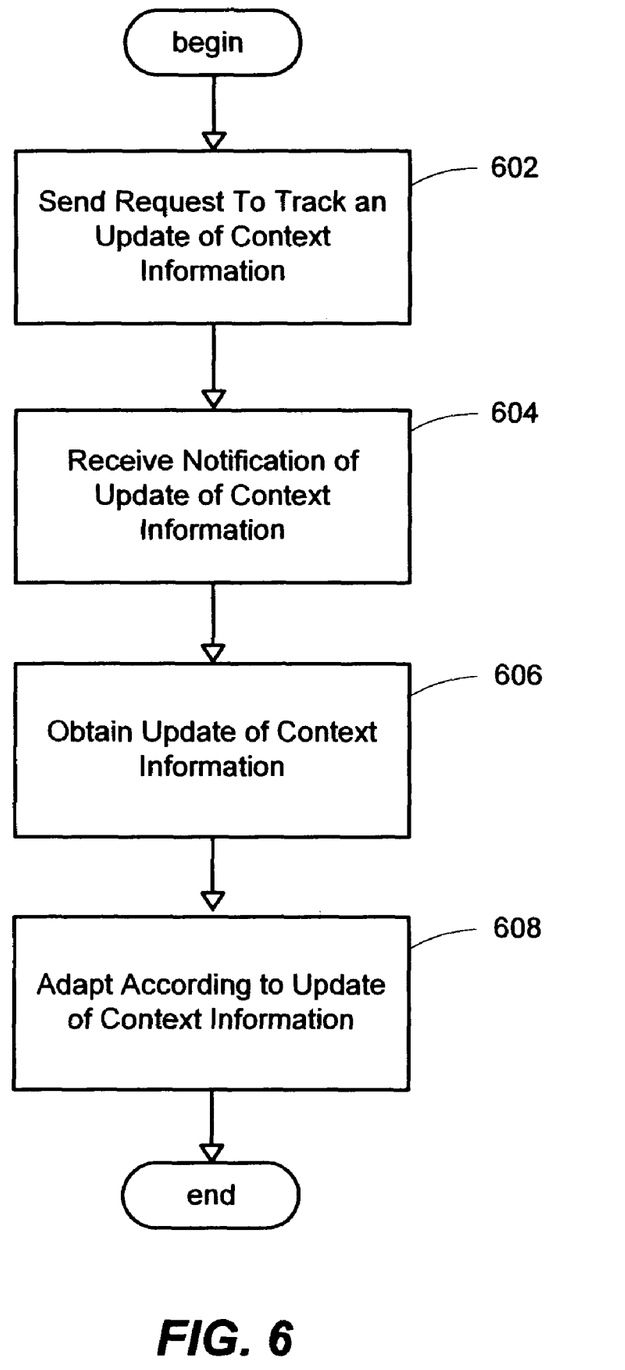
FIG. 6 is a flowchart generally representing exemplary steps undertaken by an executable in one embodiment for tracking context information, in accordance with an aspect of the present invention.

FIG. 6 presents a flowchart generally representing exemplary steps undertaken by an executable in one embodiment for tracking context information. First a request to track context information may be sent at step 602. For example, an executable that may be responsible for the default printer settings of a computer system may invoke the TrackContextData API to send a track request to the context platform to be notified of updates to context information about the network connection. Next a notification of an update of context information may be received at step 604. Then an update of the context information may be obtained at step 606. For instance, the executable of the previous example that may be responsible for the default printer settings may receive a notification of an update of context information about a new network connection and retrieve a copy of the update of the context information about the new network connection from a shared memory buffer or memory mapped file. Finally, an executable may adapt according to the update of context information at step 608. Thus, an executable like the executable of the previous example that may be responsible for the default printer settings may adapt its execution environment according to the update of context information, such as by changing the default printer settings to those used for the new network connection.

Figure 7:
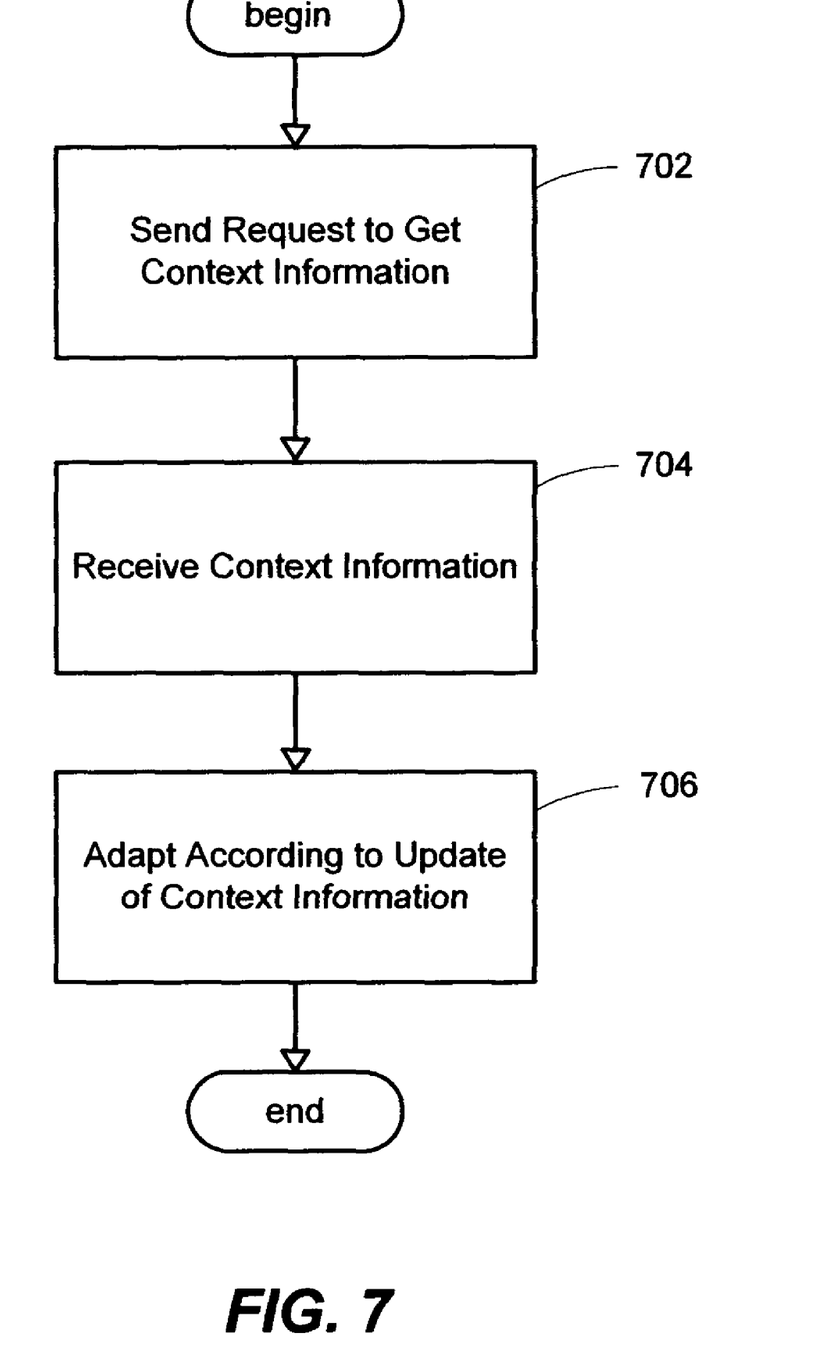
FIG. 7 is a flowchart generally representing exemplary steps undertaken by an executable in one embodiment for getting context information, in accordance with an aspect of the present invention.

FIG. 7 presents a flowchart generally representing exemplary steps undertaken by an executable in one embodiment for getting context information. First a request to get context information may be sent at step 702. For example, an executable that may be responsible for setting the default home page of a browser may invoke the GetContextData API to get the context information of the network. Next a notification of the context information may be received at step 704. Finally, an executable may adapt according to the context information obtained at step 706. For instance, the executable of the previous example that may be responsible for setting the default home page of a browser may change the default home page settings to those used for the network connection.

Figure 8:
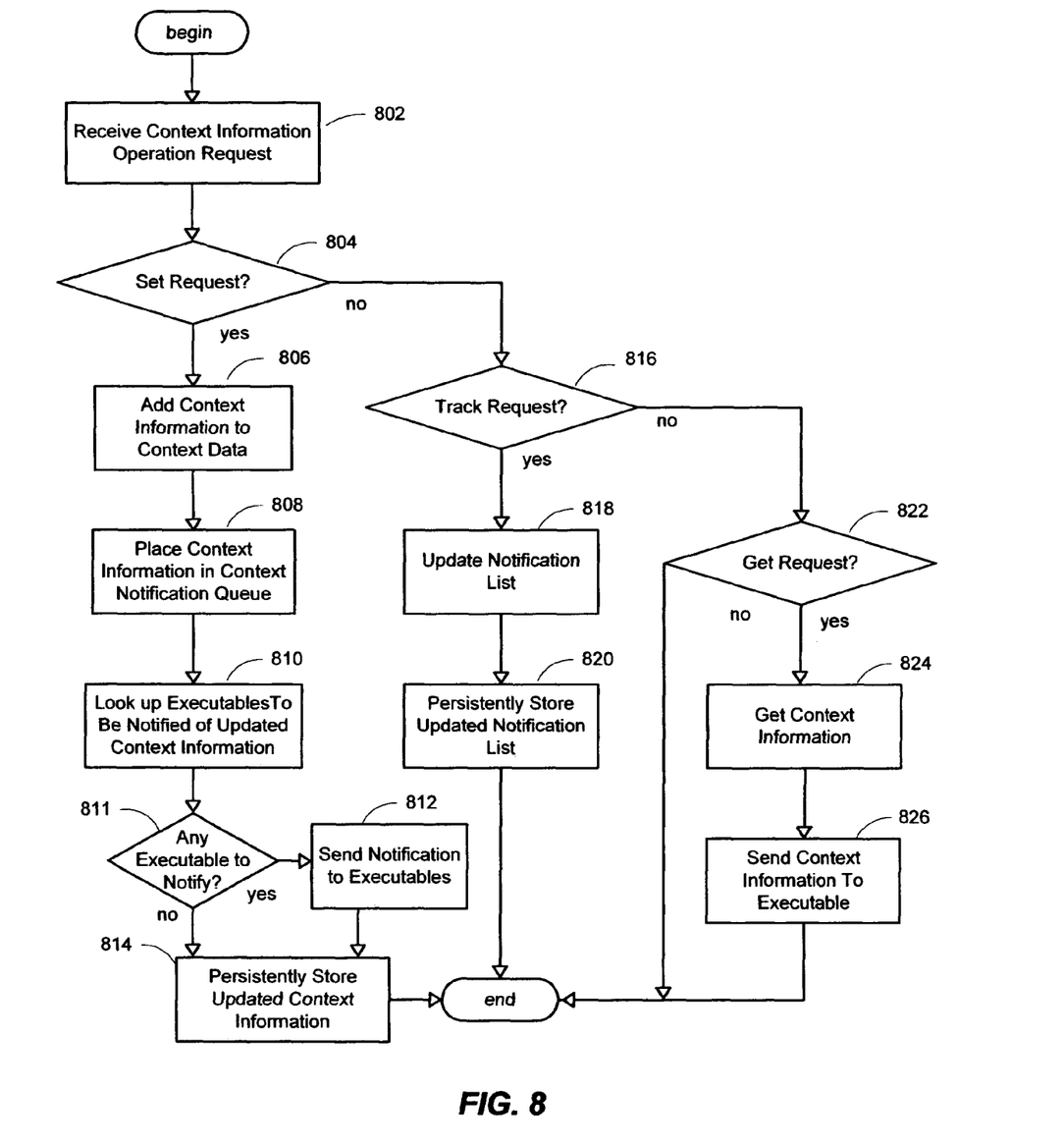
FIG. 8 is a flowchart generally representing exemplary steps undertaken by the context engine in one embodiment for performing requested context information operations, in accordance with an aspect of the present invention.

FIG. 8 presents a flowchart generally representing exemplary steps undertaken by the context engine in one embodiment for performing requested context information operations. Those skilled in the art will appreciate that an implementation may choose to perform these steps in a different order or may choose to perform only some of these steps for purposes of efficiency or flexibility, while achieving the same effect and without departing from the scope of the present invention. At step 802 a context information operation may be received. The context engine 208, for example, may receive a context information operation from an executable. At step 804, it may be determined whether the context information operation received may be a request to set context information. If so, then context information may be added at step 806 to a representation of context data stored in memory and the context information may be placed at step 808 in the context notification queue. In one embodiment, the context engine 208 may add the context information in the set request to the context data 406, and then the context engine 208 may place the context information in the context notification queue 414.

At step 810, any executables that requested to be notified of an update of this context information may be looked up in a list of executables to be notified for an update of this context information. For example, a list of executables that requested to be notified of an update in this context information may be separately stored in one embodiment in a notification table, such as notification table 418 where lists of executables may be associated with context types or GUIDs. In another embodiment, a list of executables that requested to be notified of an update in this context information may be stored in an update object that includes, among other information, the updated context information.

At step 811, it may be determined whether there are any executables that may have requested to be in a list of executables to be notified of an update of this context information. If so, then a notification may be sent to the list of executables that requested to be notified of an update in this context information at step 812. In one embodiment, context notifier 416 may read updates of context information from the context notification queue 414 and send a notification message to each executable that requested to be notified of an update in this context information. In various embodiments, the context notifier 416 may spawn one or more notifier threads 420 for asynchronously sending a notification message with the context information to notify an individual executable of an update of the context information.

After a notification may be sent to the list of executables that requested to be notified of an update in this context information at step 812 or if it may be determined that there are not any executables that may have requested to be in a list of executables to be notified of an update of this context information at step 811, then the update of the context information may be persistently stored at step 814. For instance, the context engine 208 may periodically write the updated context information in the context data 406 to persistent storage such as data store 210. After a period of inactivity, the context engine 208 may write the context data 406 in one embodiment to persistent storage prior to going to sleep. After the updated context information may be persistently stored, processing may be finished.

Returning to step 804, if the context information operation received was not a set request, then it may be determined at step 816 whether the context information operation received may be a request to track context information. If so, then the list of executables to be notified of an update of context information may be updated at step 818. Next, the updated list of executables to be notified of an update of context information may be persistently stored at step 820. For instance, the context engine 208 may periodically write the updated list of executables in the notification table 418 to persistent storage. In another embodiment, the context engine 208 may periodically write the updated list of executable in an update object that includes, among other information, the updated context information to persistent storage. After a period of inactivity, the context engine 208 may write the updated list of executables in various embodiments to persistent storage prior to going to sleep. After the updated list of executables to be notified may be persistently stored, processing may be finished.

Returning to step 816, if the context information operation received was not a track request, then it may be determined at step 822 whether the context information operation received may be a request to get context information. If so, then the context information may be retrieved at step 824. For example, in one embodiment the context engine 208 may get the context information from context data 406. In another embodiment, the context engine 208 may get the context information from data store 210. Next, the context information may be sent at step 826 to requestor. After sending the context information to the executable that sent the get request, processing may be finished. In one embodiment, a notification may be sent to the list of executables that requested to be notified of an update in this context information whenever any executable may receive context information in response to sending a get request.

Advantageously, the system and method may allow a computer system to accumulate and expose context information about the execution environment, so that the context information may be used to intelligently adapt the computer to the execution environment. An executable may adapt the execution environment by using a single item of context information or may adapt the execution environment by using multiple items of context information. Moreover, an executable may operate independent of other executables or in conjunction with several executables to set context information or adapt the execution environment using available context information. The context information may be aggregated at a platform level in a unified data store so that any executable running on the platform may provide or use the context information to intelligently adapt the computer system to enhance a user's productivity.

As can be seen from the foregoing detailed description, the present invention provides an improved system and method for a context-awareness platform that may be used to adapt a execution environment. The architecture of the present invention provides components and a framework with interfaces for setting, tracking, and getting context information. The system and framework provided is extensible. Any type of context information may be used, including user context data, executable context data, and system context data. Any number of executables may be supported that may provide or use context information. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device on which multiple executables run, a method for receiving updates to context information from a first executable and notifying a second executable of the updates, the method comprising:

receiving, at a context engine, a request from the second executable to register the second executable to receive notifications of updates to the context information of the computing device;

the context engine associating the second executable with the context information, wherein the context information is stored in a computer storage medium;

receiving, at the context engine, a request from the first executable to update the context information;

the context engine updating the context information, wherein the context information is stored as a client object that contains the following: a first context object that defines the context information before the context information was updated, a second context object that defines the current context information, a property that identifies the type of the first and second context objects, and a flag that indicates whether the first executable is currently resident in memory;

upon updating the context information, the context engine determining that the second executable is registered to receive notifications of updates to the context information; and the context engine sending a notification to the second executable that the context information has been updated; and upon receiving the notification, the second executable accessing the client object and updating system settings of the computing device based on the contents of the client object, wherein the system settings comprise one or more of:

a default printer setting;

a default internet browser home page; and internet browser proxy settings.

2. The method of claim 1, wherein the context information represents a context of a network to which the computing device is connected, and wherein the notification indicates the current context and the previous context of the network, such that the current context indicates that the computing device is connected to the a first network and the previous context indicates that the computing device was either connected to another network, or was not connected to any network.

3. The method of claim 1, wherein the context engine updating the context information further comprises:
the context engine storing the client object and any executables that have requested notifications of changes in the context information in an update object;
the context engine placing the update object in a queue and awakening a context notifier by spawning a separate thread; and
wherein the context engine sending the notification further comprises:
the context notifier accessing the update object to determine that the notification should be sent to the second executable; and
the context notifier spawning a notifier thread to asynchronously send the notification to the second executable.

4. The method of claim 3, further comprising:
storing the update object in persistent memory after a predetermined time has elapsed without receiving an update to the context information.

5. The method of claim 1, wherein the context engine stores a list of the executables that have requested notifications of changes in the context information in a separate notification list that associates the context information with each of the executables.

6. The method of claim 1, further comprising:
receiving, at the context engine, a request from a third executable to register the third executable to receive notifications of changes to second context information, wherein the second context information comprises one of:
user context information;
executable context information; and
system context information; and
the context engine associating the third executable with the second context information such that upon the second context information being updated, the context engine sends a notification of the update to the third executable.

7. The method of claim 6, wherein:
user context information comprises an indication that the user is performing one of surfing the web and using a presentation program;
executable context information comprises one of program settings and opened files; and
system context information comprises one of battery power level and network connectivity.

8. A computer storage media having stored computer executable instructions which when executed, by a processor of a computing device on which multiple executables run, perform a method for receiving updates to context information from a first executable and notifying a second executable of the updates comprising:
receiving, at a context engine, a request from the second executable to register the second executable to receive notifications of updates to the context information of the computing device;
the context engine associating the second executable with the context information;
receiving, at the context engine, a request from the first executable to update the context information;
the context engine updating the context information, wherein the context information is stored as a client object that contains the following: a first context object that defines the context information before the context information was updated, a second context object that defines the current context information, a property that identifies the type of the first and second context objects, and a flag that indicates whether the first executable is currently resident in memory;
upon updating the context information, the context engine determining that the second executable is registered to receive notifications of updates to the context information; and
the context engine sending a notification to the second executable that the context information has been updated; and
upon receiving the notification, the second executable accessing the client object and updating system settings of the computing device based on the contents of the client object, wherein the system settings comprise one or more of:
a default printer setting;
a default internet browser home page; and
internet browser proxy settings.

9. The computer storage medium of claim 8, wherein the context information represents a context of a network to which the computing device is connected, and wherein the notification indicates the current context and the previous context of the network, such that the current context indicates that the computing device is connected to the a first network and the previous context indicates that the computing device was either connected to another network, or was not connected to any network.

10. The computer storage medium of claim 8, wherein the context engine updating the context information further comprises:
the context engine storing the client object and any executables that have requested notifications of changes in the context information in an update object;
the context engine placing the update object in a queue and awakening a context notifier by spawning a separate thread; and
wherein the context engine sending the notification further comprises:
the context notifier accessing the update object to determine that the notification should be sent to the second executable; and
the context notifier spawning a notifier thread to asynchronously send the notification to the second executable.

11. The computer storage medium of claim 10, further comprising:
storing the update object in persistent memory after a predetermined time has elapsed without receiving an update to the context information.

12. The computer storage medium of claim 8, wherein the context engine stores a list of the executables that have requested notifications of changes in the context information in a separate notification list that associates the context information with each of the executables.

13. The computer storage medium of claim 8, further comprising:
receiving, at the context engine, a request from a third executable to register the third executable to receive notifications of changes to second context information, wherein the second context information comprises one of:

user context information;

executable context information; and system context information; and the context engine associating the third executable with the second context information such that upon the second context information being updated, the context engine sends a notification of the update to the third executable.

14. The computer storage medium of claim 13, wherein:

user context information comprises an indication that the user is performing one of surfing the web and using a presentation program;

executable context information comprises one of program settings and opened files; and system context information comprises one of battery power level and network connectivity.

\* \* \* \* \*